(12) United States Patent
Maure et al.

(10) Patent No.: US 11,046,350 B1
(45) Date of Patent: Jun. 29, 2021

(54) VEHICLE STEERING WHEEL INSTALLATION DEVICE

(71) Applicant: Honda Motor Co., Ltd., Tokyo (JP)

(72) Inventors: Michael J. Maure, Medonte (CA); Benjamin B. MacArthur, Barrie (CA); Thien Phung, Toronto (CA); Matthew Gowthorpe, Burlington (CA); Tyler John Edward Thomas Zettler, New Lowell (CA); Matthew Peter Gleeson, Everett (CA)

(73) Assignee: HONDA MOTOR CO., LTD., Tokyo (JP)

( * ) Notice: Subject to any disclaimer, the term of this patent is extended or adjusted under 35 U.S.C. 154(b) by 43 days.

(21) Appl. No.: 16/789,161

(22) Filed: Feb. 12, 2020

(51) Int. Cl.
| | |
|---|---|
| *B62D 1/10* | (2006.01) |
| *G02B 25/00* | (2006.01) |
| *B62D 1/16* | (2006.01) |
| *B60Q 3/283* | (2017.01) |
| *F16B 5/02* | (2006.01) |
| *F21S 4/00* | (2016.01) |
| *B60R 16/033* | (2006.01) |
| *F21W 106/00* | (2018.01) |

(52) U.S. Cl.
CPC ............ *B62D 1/10* (2013.01); *B60Q 3/283* (2017.02); *B60R 16/033* (2013.01); *B62D 1/16* (2013.01); *F16B 5/02* (2013.01); *F21S 4/00* (2013.01); *G02B 25/002* (2013.01); *F21W 2106/00* (2018.01)

(58) Field of Classification Search
CPC .... B62D 1/10; B62D 1/16; F16B 5/02; B60Q 3/283; G02B 25/002
USPC ............................................ 280/779; 74/552
See application file for complete search history.

(56) References Cited

U.S. PATENT DOCUMENTS

| | | |
|---|---|---|
| 5,847,883 A | 12/1998 | Rispoli, Sr. |
| 8,511,524 B2 | 8/2013 | Heinl |
| 8,520,326 B1 | 8/2013 | Coats |
| 9,703,091 B2 | 7/2017 | Mitchell et al. |

FOREIGN PATENT DOCUMENTS

| | | |
|---|---|---|
| EP | 0543483 A1 | 8/1992 |
| JP | 2020161446 A | * 10/2020 |

* cited by examiner

*Primary Examiner* — Ruth Ilan
*Assistant Examiner* — Matthew D Lee
(74) *Attorney, Agent, or Firm* — Armstrong Teasdale LLP

(57) ABSTRACT

An installation device is used to install a steering wheel onto a steering column having a plurality of column splines, wherein the steering wheel includes a plate with a central opening and a plurality of wheel splines configured to engage the plurality of column splines. The installation device includes a frame including a base and a cover removably coupled to the base. The installation device also includes a first magnification lens coupled to the frame, and a first pair of posts coupled to the base. The first pair of posts are configured for insertion into a pair of corresponding openings on the steering wheel such that the first pair of posts position the first magnification lens a first predetermined distance from the steering wheel to focus the first magnification lens on the plurality of wheel splines.

20 Claims, 8 Drawing Sheets

VEHICLE STEERING WHEEL INSTALLATION DEVICE

BACKGROUND

The present disclosure relates generally to an installation device, and, more specifically, to an installation device for installing a steering wheel onto a steering column of a vehicle.

At least some known vehicle steering systems include a steering column and a steering wheel configured to attach to the steering column. More specifically, at least some known steering columns include a plurality of column splines about a circumference of a shaft, and at least some known steering wheels include a plurality of wheel splines about a circumference of an opening. When installing the steering wheel onto the steering column, the shaft is inserted into the opening such that the column splines engage the wheel splines. However, due to the small size of the splines and/or less than ideal lighting conditions, it may be difficult for a technician to align the far end of the wheel splines with the near end of the column splines. In some cases, even minor misalignment of the splines is undesirable.

BRIEF SUMMARY

In one aspect, an installation device for installing a steering wheel onto a steering column is provided. The steering column includes a plurality of column splines, and the steering wheel includes a plate with a central opening and a plurality of wheel splines configured to engage the plurality of column splines. The installation device includes a frame including a base and a cover removably coupled to the base. The installation device also includes a first magnification lens coupled to the frame, and a first pair of posts coupled to the base. The first pair of posts are configured for insertion into a pair of corresponding openings on the steering wheel such that the first pair of posts position the first magnification lens a first predetermined distance from the steering wheel to focus the first magnification lens on the plurality of wheel splines.

In another aspect, a method of operating an installation device for installing a steering wheel onto a steering column is provided. The steering column includes a plurality of column splines, and the steering wheel includes a plate with a central opening and a plurality of wheel splines configured to engage the plurality of column splines. The method includes removably coupling a first magnification lens between a base and a cover of a frame, and removably coupling a first pair of posts to the base. The method also includes inserting the first pair of posts into a pair of corresponding openings formed in the steering wheel plate such that the first pair of posts position the first magnification lens a first predetermined distance from the steering wheel to focus the first magnification lens on the plurality of wheel splines.

DETAILED DESCRIPTION

Figure 1:
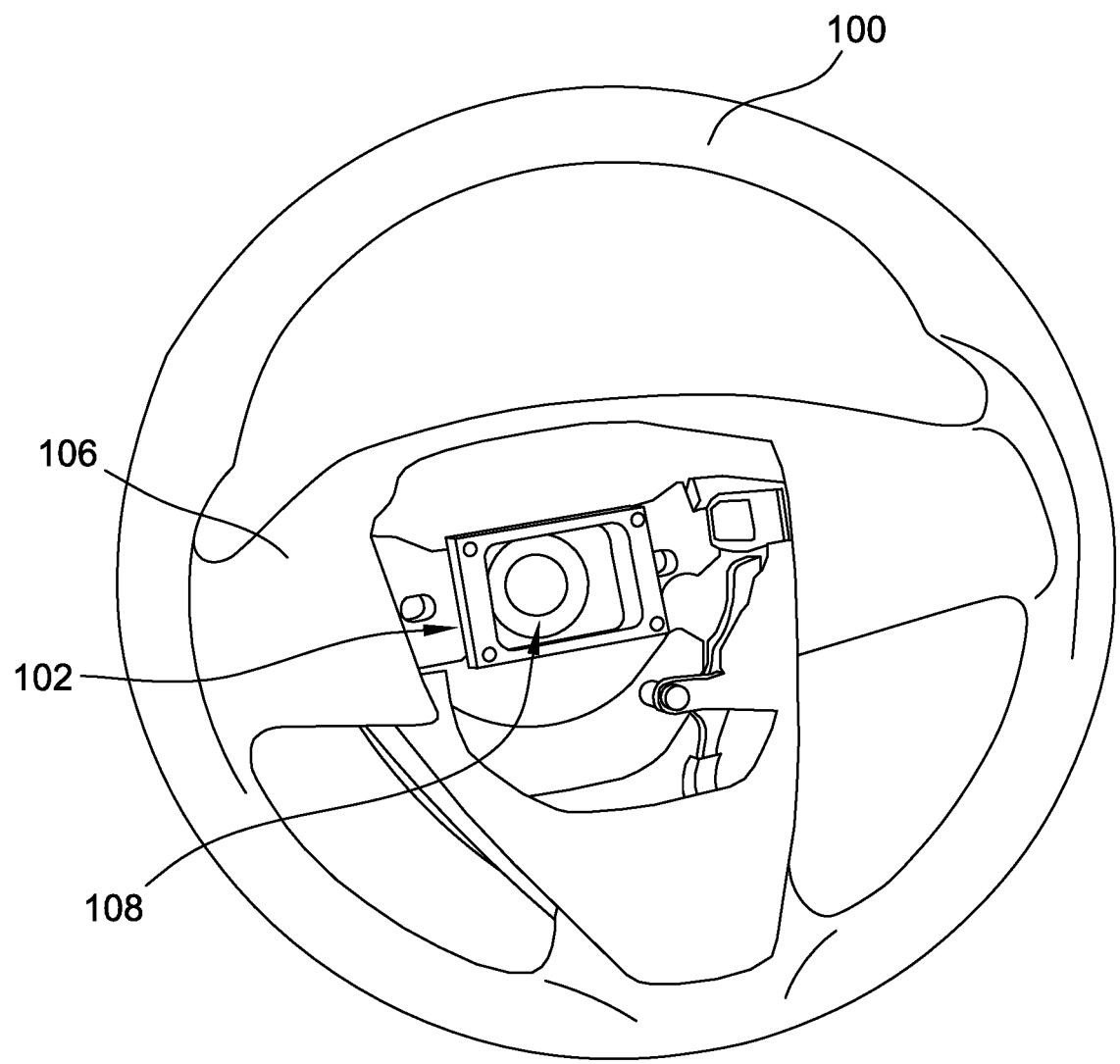
FIG. 1 is a perspective view of a vehicle steering wheel with an exemplary installation device attached thereto.

The present disclosure relates generally to an installation device, and, more specifically, to an installation device for installing a steering wheel onto a steering column of a vehicle.

The systems and methods above describe an installation device for installing a steering wheel onto a steering column. The steering column includes a plurality of column splines, and the steering wheel includes a plate with a central opening and a plurality of wheel splines configured to engage the plurality of column splines. The installation device includes a frame including a base and a cover removably coupled to the base. The installation device also includes a first magnification lens removably coupled between the base and the cover, and a first pair of posts removably coupled to the base. The first pair of posts are configured for insertion into a pair of corresponding openings on the steering wheel such that the first pair of posts position the first magnification lens a first predetermined distance from the steering wheel to focus the first magnification lens on the plurality of wheel splines. In one embodiment, the installation device also includes a lighting system that illuminates the wheel splines when the posts are inserted into the steering wheel plate.

The installation device described herein allow a technician to quickly and easily position the magnification lens before installation of the steering wheel on a steering column, and quickly and easily remove it once the steering wheel is installed. Once the wheel splines are aligned with the column splines and the steering wheel is installed, the posts are removed from the plate before moving to the next vehicle. The predefined distance between the steering wheel plate and the magnification lens is determined by the length of the posts and is based on the model of the vehicle on which the steering wheel is being installed. As described herein, the posts are interchangeable with other posts of different lengths to change the distance between the magnification lens and the steering wheel plate according to different vehicle models or technician preference. Furthermore, the cover of the frame is removable to enable the magnification lens to be replaced with a lens having a different magnification or a new lens of the same magnification. Additionally, the posts position the magnification lens at the predetermined distance such that the focus of the magnification lens is concentrated at a distal end of the wheel splines to facilitate alignment of the wheel splines with the column splines.

The lighting system provides additional light directly to the wheel splines to aid the technician with aligning the wheel splines and column splines. Specifically, in one embodiment, the lighting system is electrically coupled to the posts such that physical contact between the ferrous posts and the steering wheel plate automatically activate the light strip on the rear of the installation device, and deactivate when the posts are removed from the openings in the steering wheel plate.

Figure 2:
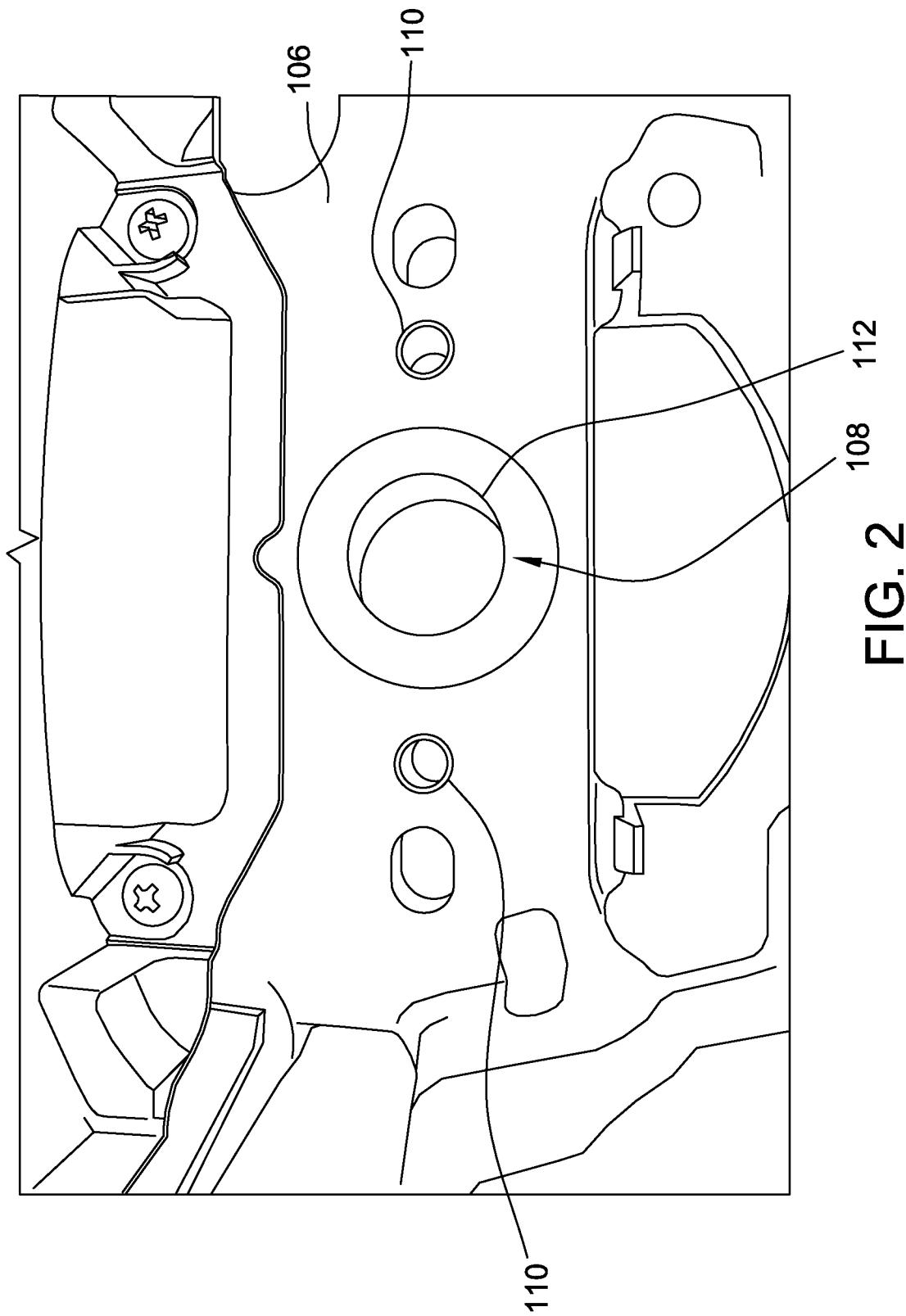
FIG. 2 is a front view of the steering wheel shown in FIG. 1 illustrating a plurality of wheel splines.

FIG. 1 is a perspective view of a vehicle steering wheel 100 with an exemplary installation device 102 attached thereto. FIG. 2 is a front view of vehicle steering wheel 100. In the exemplary embodiment, vehicle steering wheel 100 is for an automobile. In other embodiments, vehicle steering wheel 100 may be for any of a variety of other suitable vehicles, such as a recreational vehicle or a utility vehicle, for example. As described herein, vehicle steering wheel 100 is coupled to a steering column 104 (shown in FIG. 7) to facilitate turning the wheels (not shown) of the vehicle in a desired direction. Vehicle steering wheel 100 includes a steering wheel plate 106 with a central opening 108 defined therethrough. Steering wheel plate 106 also includes an opening 110 positioned on both sides of central opening 108. A plurality of wheel splines 112 are positioned about the circumference of central opening 108 and are configured to engages a plurality of column splines 114 (shown in FIG. 7) to facilitate installing vehicle steering wheel 100 onto steering column 104.

Figure 3:
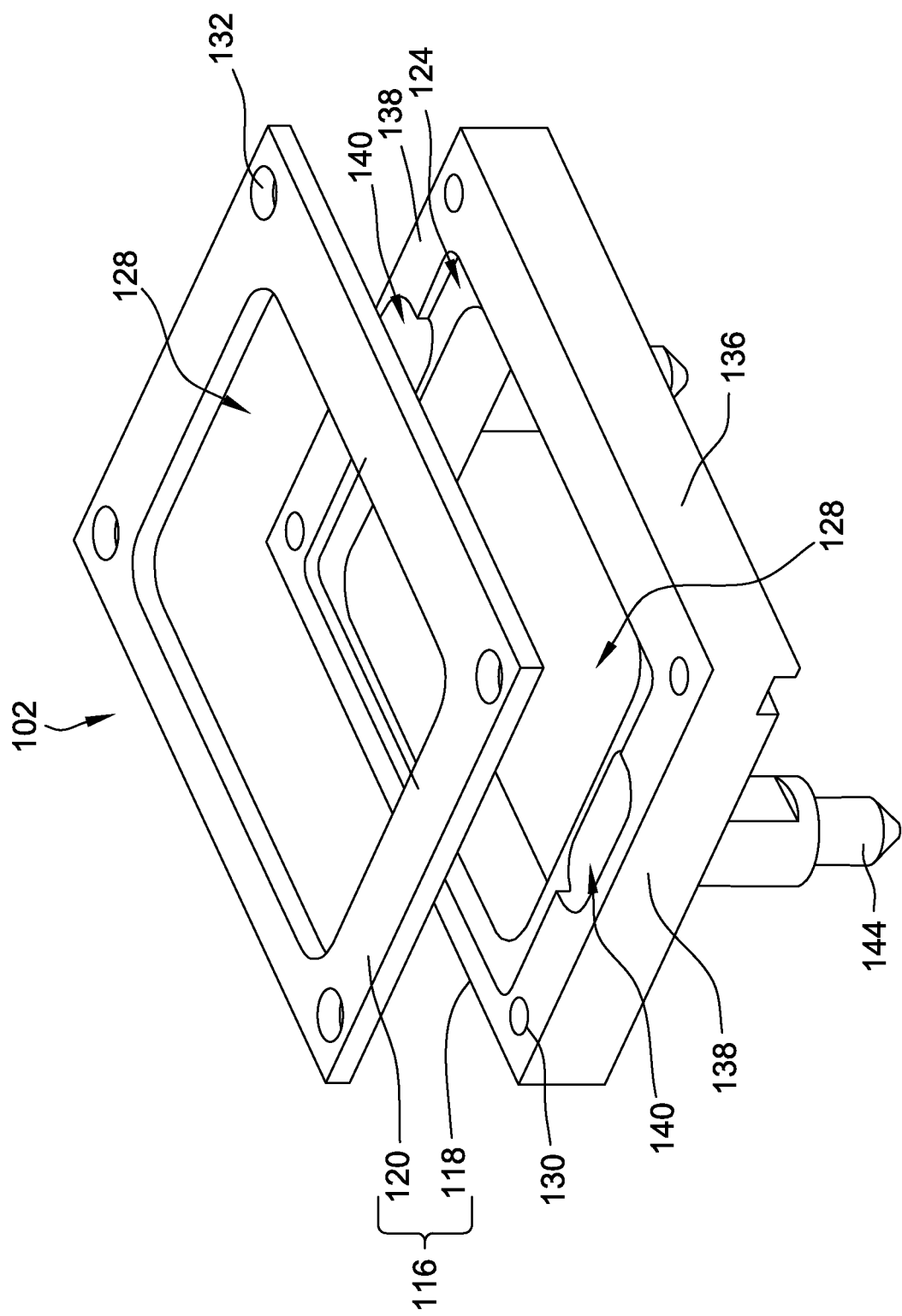
FIG. 3 is a partial exploded view of the installation device shown in FIG. 1 illustrating a base and a cover.
Figure 4:
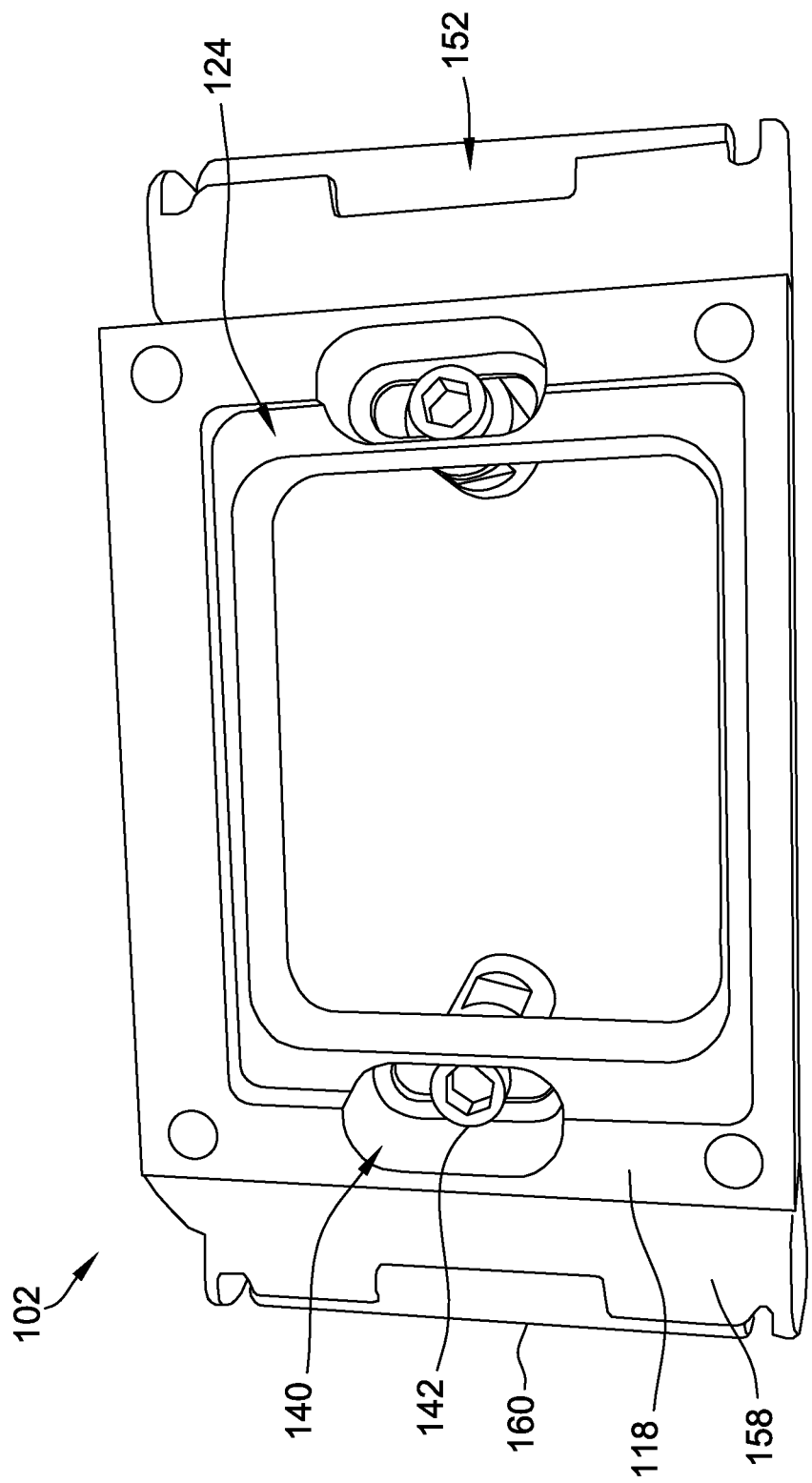
FIG. 4 is a top perspective view of the installation device shown in FIG. 1 with the cover removed.
Figure 5:
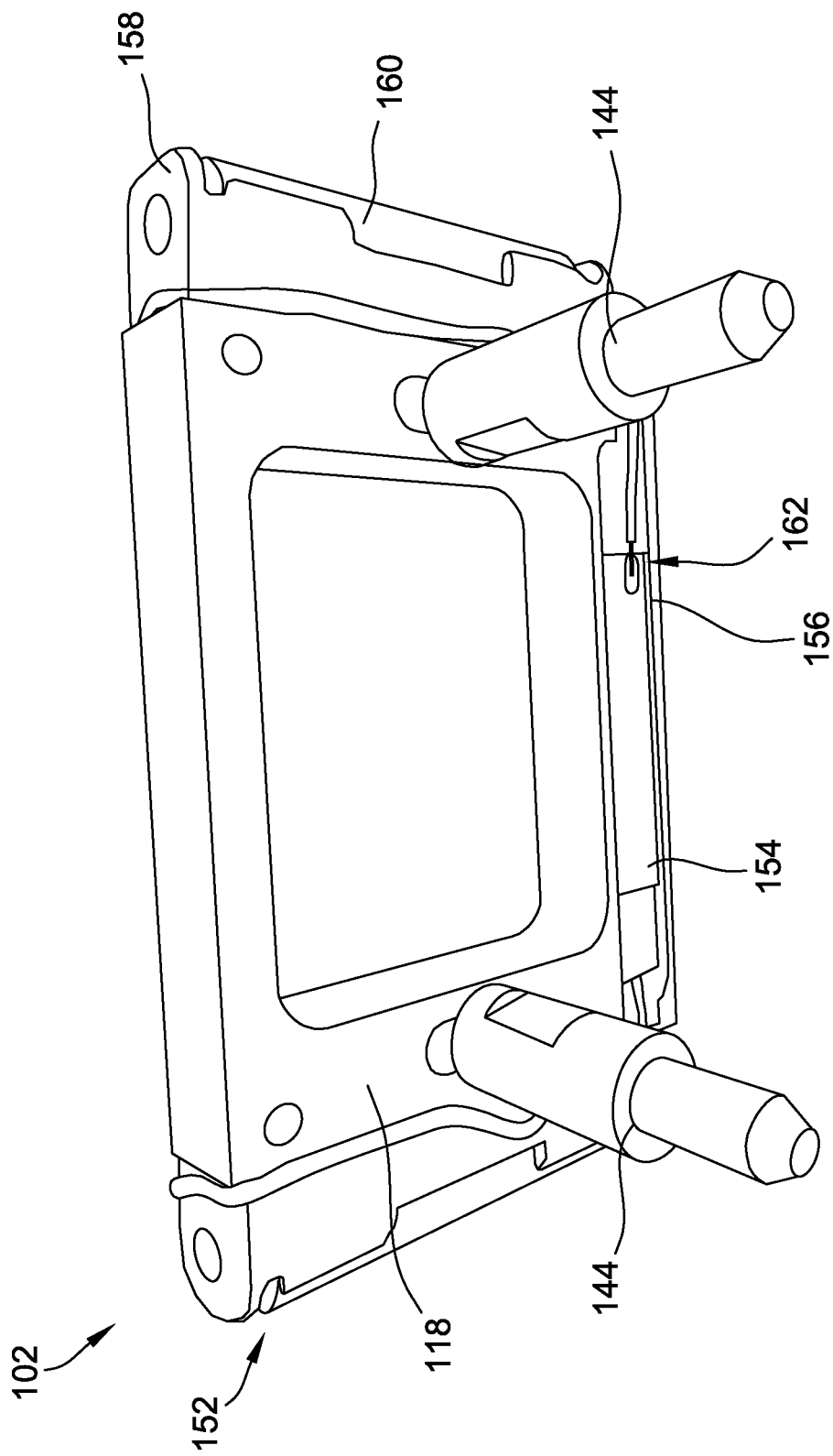
FIG. 5 is a bottom perspective view of an embodiment of the installation device shown in FIG. 1 that includes a lighting system.

FIG. 3 is a partial exploded view of installation device 102. In the exemplary embodiment, installation device 102 includes a frame 116 that includes a base 118 and a cover 120 removably coupled to base 118. FIG. 4 is a top perspective view of installation device 102 with cover 120 removed. FIG. 5 is a bottom perspective view of installation device 102 illustrating a lighting system 152 coupled to frame 116. In the exemplary embodiment, installation device 102 also includes a first magnification lens 122 removably coupled between base 118 and cover 120. Specifically, base 118 includes a countersink 124 that receives first magnification lens 122 therein to prevent first magnification lens 122 from shifting relative to frame 116. Furthermore, base 118 includes a central base opening 126, and cover 120 includes a central cover opening 128 that at least partially overlaps central base opening 126 to allow a technician to view steering wheel plate 106 through first magnification lens 122.

Base 118 includes a first plurality of fastener holes 130 and cover 120 includes a second plurality of fastener holes 132 that align with holes 130 to receive a fastener (not shown) to removably attach cover 120 to base 118. In operation, a technician is able to remove cover 120 from base 118 to replace first magnification lens 122 with a different lens. For example, first magnification lens 122 may become dirty or scratched through normal wear and tear and require replacement. Further, first magnification lens 122 can be replaced with a second magnification lens 134 (shown in FIG. 8) that has a different magnification than first magnification lens 122. Specifically, second magnification lens 134 may be used with a different vehicle than first magnification lens 122, or second magnification lens 134 may be used by a different technician. As such, first magnification lens 122 is interchangeable with second magnification lens 134 based on a desired magnification.

In the exemplary embodiment, base 118 also includes a pair of side members 136 and a pair of end members 138. Countersink 124 is partially formed in each member 136 and 138 such that first magnification lens 122 contacts each member 136 and 138. End members 138 each include a through-hole 140 that is configured to receive a fastener assembly 142 for coupling a first post 144 to base 118. As shown in FIGS. 3 and 4, countersink 124 partially overlaps with each through-hole 140.

In the exemplary embodiment, installation device 102 includes a first pair of posts 144 that are each removably coupled to base 118. First pair of posts 144 are configured for insertion into openings 110 in steering wheel plate 106 and position first magnification lens 122 a predetermined distance D1 (shown in FIG. 7) from steering wheel plate 106 to focus first magnification lens 122 on plurality of wheel splines 112.

Figure 7:
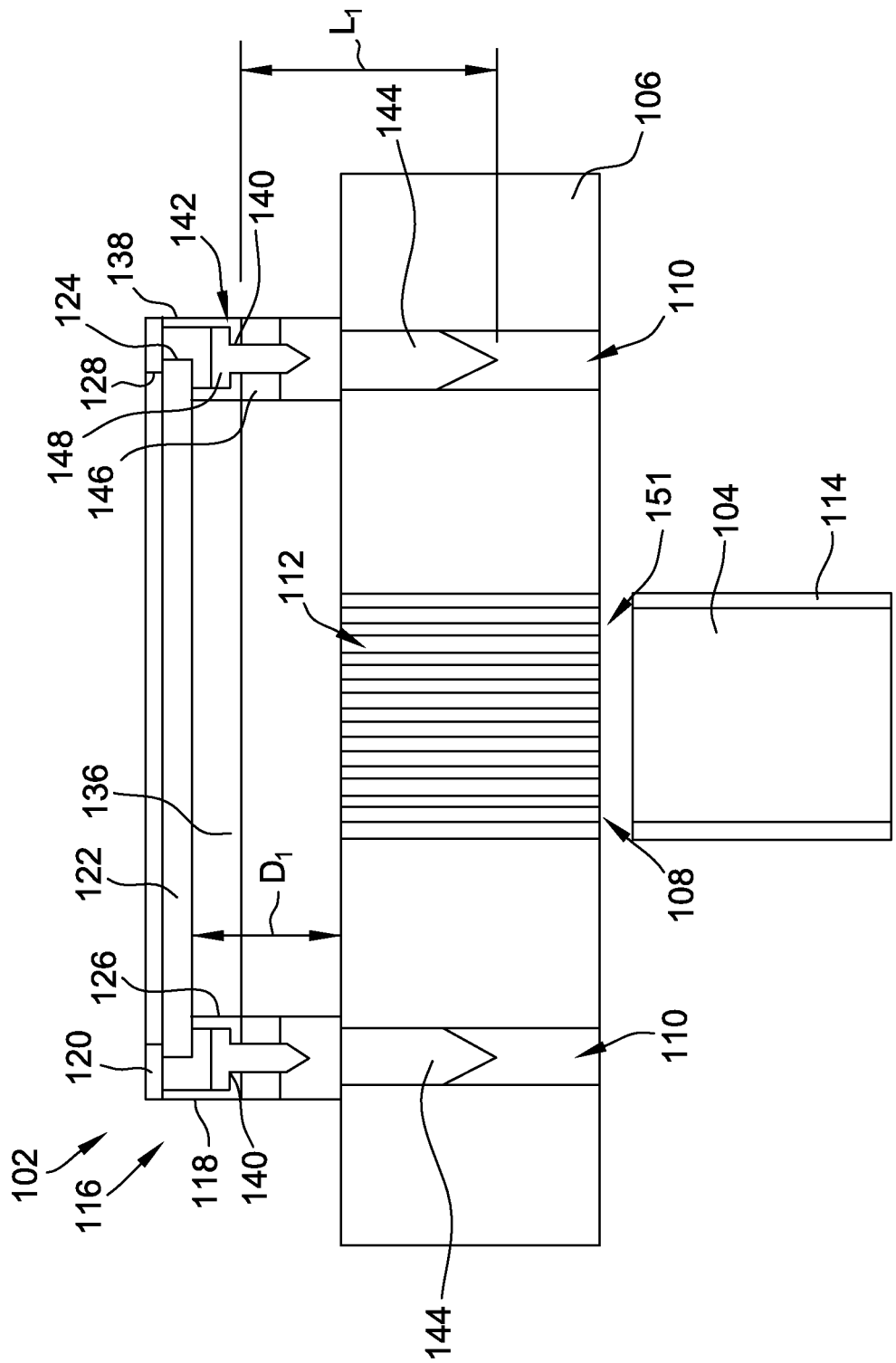
FIG. 7 is a cross-sectional view of the installation device of FIG. 1 positioned a first distance from a portion of the steering wheel.

Referring now to FIGS. 4 and 7, installation device 102 includes a pair of fastener assemblies 142 that are each inserted into through-hole 140 to couple first pair of posts 144 to base 118 of frame 116. Specifically, each fastener assembly 142 includes a threaded insert 146 positioned within hollow posts 144 and a screw 148 that is inserted through through-hole 140 in base 118 to engage threaded insert 146. In the exemplary embodiment, first pair of posts 144 include a first length L1 that position first magnification lens 122 the first distance D1 from steering wheel plate 106. Installation device 102 also includes a second pair of posts 150 that include a second length L2 (shown in FIG. 8) that position first magnification lens 122 or second magnification lens 134 a second distance D2, that is different than first distance D1, from steering wheel plate 106. As such, similar to magnification lenses 122 and 134, posts 144 and 150 are interchangeable and may both be used in installation device 102 based on a vehicle model and/or a technician's desired magnification.

Figure 8:
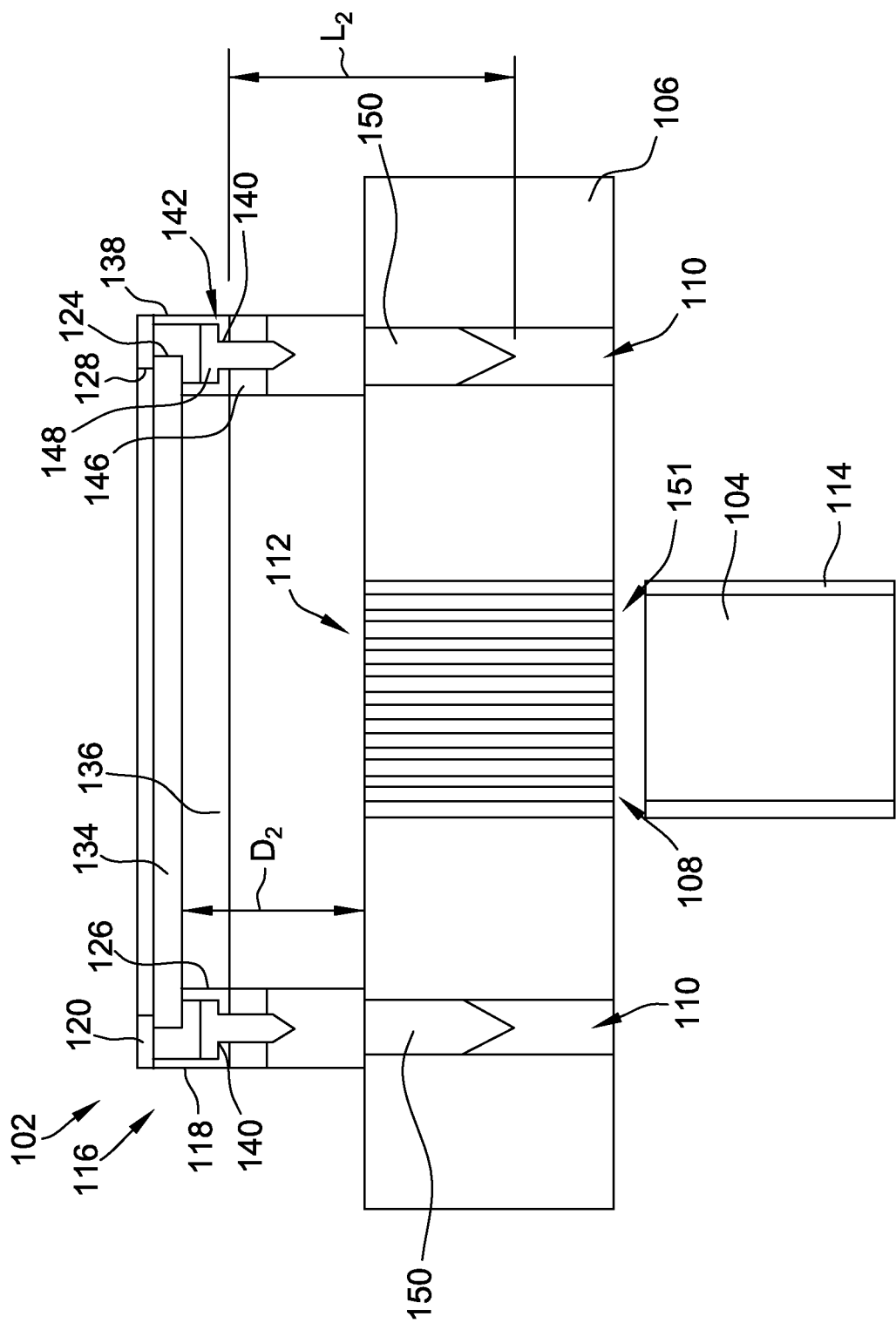
FIG. 8 is a cross-sectional view of the installation device of FIG. 1 positioned a second distance from the portion of the steering wheel.

More specifically, posts 144 and 150 position magnification lens 122 or 134 a distance above steering wheel plate 106 such that the focus of magnification lens 122 or 134 is concentrated on a distal end 151 of wheel splines 112. As shown in FIGS. 7 and 8, steering column 104 enters central opening 108 at distal end 151, opposite installation device 102. As such, the magnification and focus of magnification lenses 122 and 134 are configured such that distal ends 151 of wheel splines 112 are clearly visible to facilitate alignment of distal ends 151 of wheel splines 112 with column splines 114. In the exemplary embodiment, a technician may use any combination of posts 144 or 150 and magnification lenses 122 or 134 to facilitate installing steering wheel 100 onto steering column 104. Despite only two magnification lenses 122 and 134 and two pairs of posts 144 and 150 described herein, installation device 102 may include any number of lenses and posts that facilitate operation of installation device 102 as described herein. FIG. 8 illustrates installation device 102 with second pair of posts 150 and second magnification lens 134. The remainder of installation device 102 shown in FIG. 8 is substantially similar to that as shown in FIG. 7, and, as such, is labeled with the same reference numerals. Although FIG. 8 illustrates installation device 102 having second pair of posts 150 and second magnification lens 134, installation device 102 may include any combination of posts 144 or 150 with magnification lenses 122 or 134.

Figure 6:
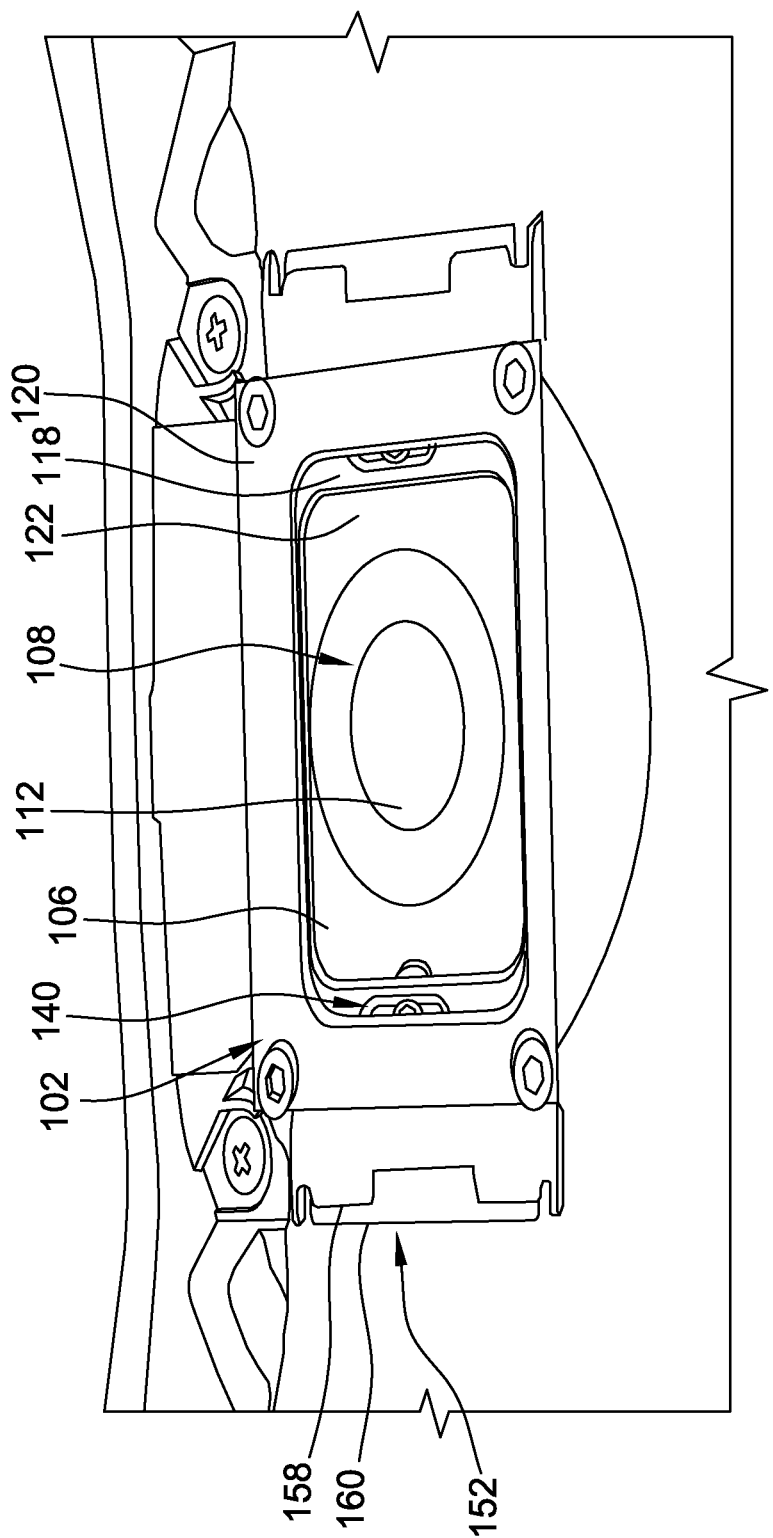
FIG. 6 is a top view of the installation device shown in FIG. 1 attached to the steering wheel.

Referring now to FIGS. 4-6, installation device also includes a lighting system 152 coupled to frame 118 and configured to illuminate wheel splines 112. Lighting system 152 includes a light strip 154 coupled to a rear surface 156 of frame 118, opposite cover 120. Lighting system 152 also includes a battery receptacle 158 coupled to base 118 and a battery 160 configured for insertion into receptacle 158. In the exemplary embodiment, light strip 154 is positioned in a groove 162 formed in rear surface 156 of base 118 and configured to receive light strip 154. Further, in the exemplary embodiment, light strip 154 includes at least one LED light. Alternatively, light strip 154 includes any type of light source to facilitate operation of installation device 102 as described herein.

In the exemplary embodiment, at least first pair of posts 144 are formed from a ferrous material and are electrically coupled to lighting system 152. Furthermore, fastener assemblies 142 are formed from a non-electrically conductive material, such as, but not limited to plastic, to electrically isolate first pair of posts 144 from frame 118. As such, fastener assemblies 142 provide first pair of posts 144 with continuity isolation. In operation, when first pair of posts 144 are inserted into openings 110, contact between first pair of posts 144 and steering wheel plate 106 completes the circuit of lighting system 152 and causes light strip 154 to illuminate. As such, light strip 154 is configured to activate upon physical contact between first pair of posts 144 and steering wheel plate 106. In such a configuration, the technician is simply able to quickly and easily insert first pair of posts 144 into openings 110 to automatically trigger lighting system 152 without having to manually actuate a switch or button, as shown in FIG. 6.

The systems and methods above describe an installation device for installing a steering wheel onto a steering column. The steering column includes a plurality of column splines, and the steering wheel includes a plate with a central opening and a plurality of wheel splines configured to engage the plurality of column splines. The installation device includes a frame including a base and a cover removably coupled to the base. The installation device also includes a first magnification lens removably coupled between the base and the cover, and a first pair of posts removably coupled to the base. The first pair of posts are configured for insertion into a pair of corresponding openings on the steering wheel such that the first pair of posts position the first magnification lens a first predetermined distance from the steering wheel to focus the first magnification lens on the plurality of wheel splines. In one embodiment, the installation device also includes a lighting system that illuminates the wheel splines when the posts are inserted into the steering wheel plate.

As such, the systems and methods described herein allow a technician to quickly and easily position the magnification lens before installation of the steering wheel on a steering column, and quickly and easily remove it once the steering wheel is installed. Specifically, the technician simply inserts the posts into the openings on the steering wheel plate to mount the installation device to the steering wheel. Once the wheel splines are aligned with the column splines and the steering wheel is installed, the posts are removed from the plate before moving to the next vehicle. The predefined distance between the steering wheel plate and the magnification lens is determined by the length of the posts and is based on the model of the vehicle on which the steering wheel is being installed. Alternatively, the predetermined distance may be based on a preference of the technician. As described herein, the posts are interchangeable with other posts of different lengths to change the distance between the magnification lens and the steering wheel plate according to different vehicle models or technician preference. Furthermore, the cover of the frame is removable to enable the magnification lens to be replaced with a lens having a different magnification or a new lens of the same magnification.

Additionally, the posts position the magnification lens at the predetermined distance such that the focus of the magnification lens is concentrated at a distal end of the wheel splines to facilitate alignment of the wheel splines with the column splines. The lighting system provides additional light directly to the wheel splines to aid the technician with aligning the wheel splines and column splines. Specifically, in one embodiment, the lighting system is electrically coupled to the posts such that physical contact between the ferrous posts and the steering wheel plate automatically activate the light strip on the rear of the installation device, and deactivate when the posts are removed. As such, the technician is not required to manually activate the lighting system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An installation device for installing a steering wheel onto a steering column having a plurality of column splines, the steering wheel having a steering wheel plate with a central opening and a plurality of wheel splines configured to engage the plurality of column splines, said installation device comprising:
 a frame comprising a base and a cover coupled to said base;
 a first magnification lens coupled to said frame; and
 a first pair of posts removably coupled to said base, wherein said first pair of posts are configured for insertion into a pair of corresponding openings on the steering wheel, and wherein said first pair of posts position said first magnification lens a first predetermined distance from the steering wheel to focus said first magnification lens on the plurality of wheel splines.

2. The installation device of claim 1, wherein said base comprises a pair of side members and a pair of end members, wherein said pair of end members each comprise a through-hole.

3. The installation device of claim 2, further comprising a fastener assembly inserted into each said through-hole to couple said first pair of posts to said frame.

4. The installation device of claim 3, wherein each said fastener assembly comprises a threaded insert positioned in a respective post of said first pair of posts and a screw inserted into said through-hole and configured to engage said threaded insert.

5. The installation device of claim 1, wherein said first pair of posts are interchangeable with a second pair of posts, wherein said second pair of posts position said first magnification lens a second predetermined distance from the steering wheel that is different than the first predetermined distance.

6. The installation device of claim 5, wherein said first pair of posts comprise a first length, and wherein said second pair of posts comprises a second length different than the first length.

7. The installation device of claim 1, wherein said first magnification lens is interchangeable with a second magnification lens based on a desired magnification.

8. The installation device of claim 1 further comprising a lighting system coupled to said frame and configured to illuminate the wheel splines, said lighting system comprising:
- a light strip coupled to a rear surface of said base, opposite said cover; and
- at least one battery coupled to said frame.

9. The installation device of claim 8, wherein said light strip is configured to activate upon physical contact between said first pair of posts and the steering wheel plate.

10. The installation device of claim 8, wherein said rear surface comprises a groove configured to receive said light strip.

11. The installation device of claim 8, wherein said frame comprises a battery receptacle coupled to said base, said battery receptacle configured to receive the at least one battery therein.

12. The installation device of claim 1, wherein said first magnification lens is coupled between said base and said cover, wherein said base comprises a countersink configured to receive said first magnification lens.

13. A method of operating an installation device for installing a steering wheel onto a steering column having a plurality of column splines, the steering wheel having a steering wheel plate with a central opening and a plurality of wheel splines configured to engage the plurality of column splines, said method comprising:
- removably coupling a first magnification lens between a base and a cover of a frame;
- removably coupling a first pair of posts to the base; and
- inserting the first pair of posts into a pair of corresponding openings formed in the steering wheel plate such that the first pair of posts position the first magnification lens a first predetermined distance from the steering wheel to provide the desired focus.

14. The method of claim 13, wherein removably coupling a first pair of posts to the base comprises:
- inserting a threaded insert into a hollow end of each post of the first pair of posts;
- inserting a screw into a through-hole defined in opposite ends of the base; and
- engaging the threaded insert with the screw to couple the first pair of posts to the base.

15. The method of claim 13, further comprising:
- removing the first pair of posts from the base, wherein the first pair of posts include a first length; and
- coupling a second pair of posts to the base, wherein the second pair of posts include a second length different than the first length, wherein the second pair of posts position the first magnification lens a second predetermined distance from the steering wheel that is different than the first predetermined distance.

16. The method of claim 13, further comprising:
- removing the cover from the base;
- removing the first magnification lens from the base;
- inserting a second magnification lens into a countersink formed in the base, wherein the second magnification lens is based on a desired magnification; and
- re-coupling the cover to the base.

17. The method of claim 13, further comprising coupling a lighting system to the base, wherein coupling a lighting system to the base comprises:
- coupling a light strip to a rear surface of the base, opposite the cover; and
- inserting a battery into a battery receptacle coupled to the base.

18. The method of claim 17, wherein inserting the first pair of posts into the pair of corresponding openings further comprises contacting the first pair of posts to the steering wheel plate to activate the lighting system of the installation device, wherein the lighting system is configured to illuminate the wheel splines.

19. The method of claim 17, wherein coupling the light strip to the rear surface of the base comprises inserting the light strip into a groove formed in the rear surface of the base.

20. The method of claim 13, wherein inserting the first pair of posts into the pair of corresponding openings focuses the first magnification lens on a distal end of the plurality of wheel splines, opposite the installation device.

\* \* \* \* \*